(12) United States Patent
Samuell et al.

(10) Patent No.: US 9,549,010 B2
(45) Date of Patent: Jan. 17, 2017

(54) METHOD AND APPARATUS FOR MEDIA SESSION IDENTIFICATION, TRACKING, AND ANALYSIS

(71) Applicant: NetScout Systems Texas, LLC., Westford, MA (US)

(72) Inventors: Charles N. Samuell, Toronto (CA); Troy M. Gonsalves, Waterloo (CA); Kevin Goertz, Waterloo (CA); Roman C. Kordasiewicz, Elmira (CA)

(73) Assignee: NetScout Systems Texas, LLC, Westford, MA (US)

( * ) Notice: Subject to any disclaimer, the term of this patent is extended or adjusted under 35 U.S.C. 154(b) by 478 days.

(21) Appl. No.: 14/029,363

(22) Filed: Sep. 17, 2013

(65) Prior Publication Data
US 2014/0082206 A1 Mar. 20, 2014

Related U.S. Application Data

(60) Provisional application No. 61/701,833, filed on Sep. 17, 2012.

(51) Int. Cl.
*G06F 15/16* (2006.01)
*H04L 29/06* (2006.01)
*H04L 29/08* (2006.01)
*H04N 17/00* (2006.01)
*H04N 21/647* (2011.01)

(52) U.S. Cl.
CPC .......... *H04L 65/60* (2013.01); *H04L 65/1069* (2013.01); *H04L 65/4084* (2013.01); *H04L 67/14* (2013.01); *H04N 17/004* (2013.01); *H04N 21/64784* (2013.01)

(58) Field of Classification Search
CPC ....... H04L 41/5038; H04L 65/60; H04L 67/14
USPC ......................................... 709/223, 224, 227
See application file for complete search history.

(56) References Cited

U.S. PATENT DOCUMENTS

| 8,599,684 | B1 * | 12/2013 | Goertz | H04L 43/10 370/229 |
| 9,032,427 | B2 * | 5/2015 | Gallant | H04L 41/5038 725/9 |
| 2012/0311121 | A1 * | 12/2012 | Shafrir | H04L 12/66 709/223 |

(Continued)

*Primary Examiner* — Kristie Shingles
(74) *Attorney, Agent, or Firm* — Locke Lord LLP; Scott D. Wofsy; Christopher J. Capelli

(57) ABSTRACT

In a networked system connecting a subscriber to a content source via one or more networks, a computer-implemented method includes instantiating a session model for a media session between the subscriber and the content source, the session model to generate session metadata from application-layer interactions between the subscriber and the content source. The method further includes instantiating an interaction model in response to detecting an application-layer interaction in a transport flow of the subscriber, the application-layer interaction comprising media data for the media session. The method also includes generating, at the interaction model, interaction metadata representative of the application-layer interaction, and processing at least one of the interaction metadata and the media data at the session model to generate session metadata responsive to matching the interaction model to the session model.

20 Claims, 6 Drawing Sheets

(56) References Cited

U.S. PATENT DOCUMENTS

2013/0031575 A1* 1/2013 Gallant ............... H04L 41/5038
                                                                  725/20
2014/0012981 A1* 1/2014 Samuell ............. H04L 43/0811
                                                                 709/224

* cited by examiner

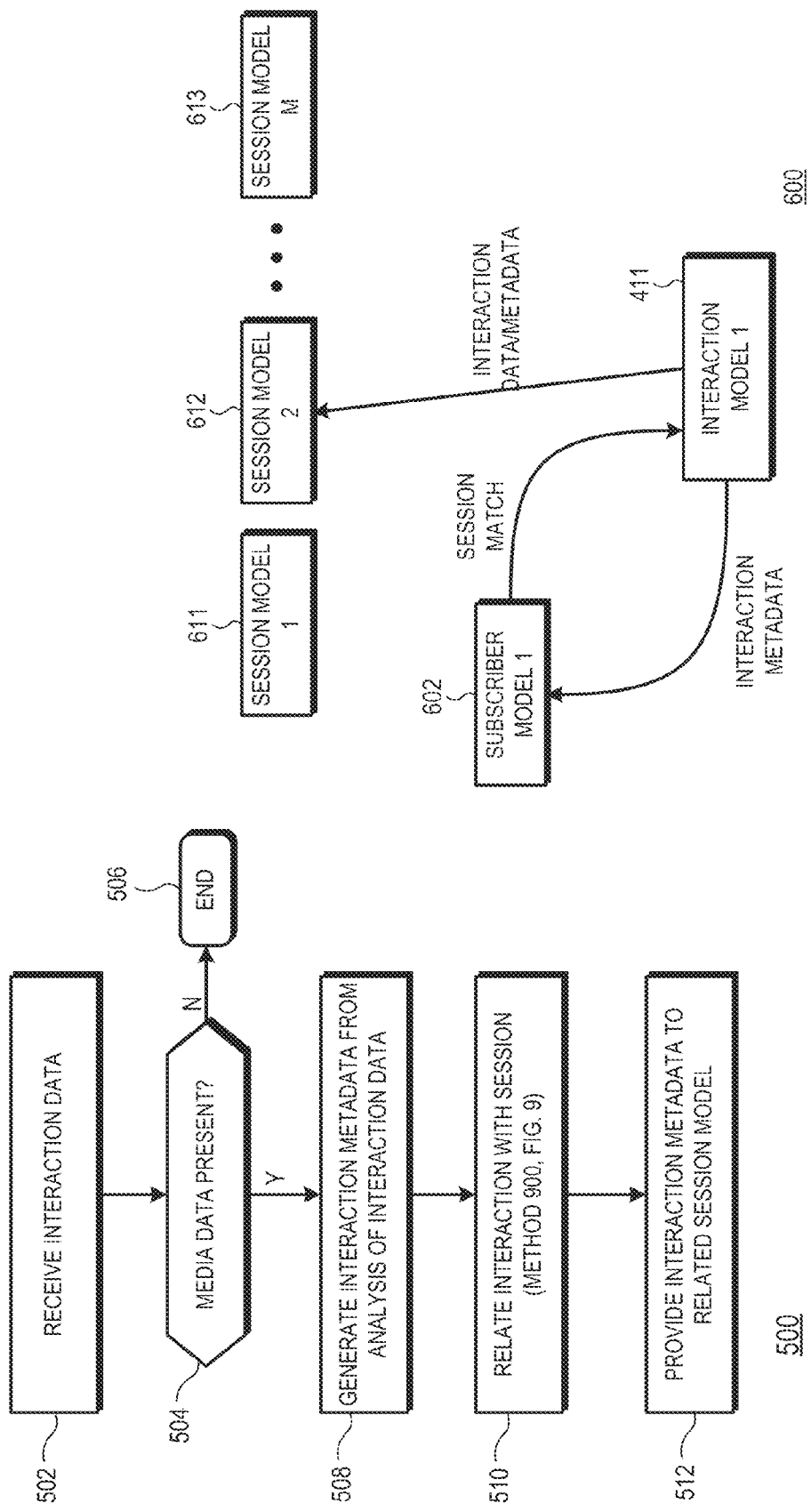

METHOD AND APPARATUS FOR MEDIA SESSION IDENTIFICATION, TRACKING, AND ANALYSIS

CROSS-REFERENCE TO RELATED APPLICATIONS

The present disclosure claims priority to U.S. Provisional Patent Application No. 61/701,833, entitled "Method and Apparatus for Media Session Identification and Tracking" and filed on Sep. 17, 2012, the entirety of which is incorporated by reference herein.

FIELD OF THE DISCLOSURE

The present disclosure generally relates to the streaming of media data in a network and more particularly relates to the identification, organization, tracking, and analysis of streaming media in a network.

BACKGROUND

Streamed media, particularly video, represents an increasingly large percentage of the data delivered over the Internet and other networks. As the popularity of media streaming increases, network providers, content providers, and other service providers increasing are evaluated by their customers based on their ability to deliver media at a high standard of quality. As such, it is ineffective to simply consider media as another category of traffic on the Internet, represented merely in standard network metrics, such as in gigabits per second; rather, it behooves service providers to obtain an accurate understanding of the customer's experience by analyzing how individual media sessions were delivered to the customer. However, tracking of all the possible ways media can be delivered to a device is impractical due to time and resource constraints.

A media session can be defined as a single, specific instance of an end user viewing a streaming video or audio clip on a device, as perceived by the end user, independent of how the content was delivered over the network. For example, an end user might view a short 30 second video on a media site such as YouTube, or watch a full length movie on another site such as Netflix. Both of these are examples of a media session, even though the specifics of how the content was delivered might be very different.

Conventional tools built for analyzing network traffic are of limited use for media session analysis. Initially, media streaming over the Internet was relatively simple; most streaming services used a single Transmission Control Protocol (TCP) flow and a single HyperText Transport Protocol (HTTP) request/response (that is, an interaction") to obtain the entire media for a session. Therefore, there was a one-to-one correspondence between TCP flows and HTTP interactions, and a one-to-one correspondence between HTTP interactions and media sessions. However, streaming services have evolved to frequently use parallel TCP flows to optimize delivery, and within each flow multiple HTTP interactions are used to stream the media content in smaller fragments. In such configurations, there is a one-to-many correspondence between TCP flows and HTTP interactions, and a many-to-one correspondence between HTTP interactions and media sessions. As such, to accurately model a modern media session using conventional tools, a conventional analytical tool would have to search through the entirety of the HTTP interactions issued by a subscriber, locate all the fragments related to the specific session, and combine all the fragments in order to complete the analysis. This is a complex solution that must be performed perfectly accurately, as a single missing fragment will render a streaming media session useless. To complicate matters further, streaming services often utilize multiple servers for delivering media content, which results in an individual media session if often being composed of fragments from multiple servers, each of which uses multiple flows and multiple interactions.

BRIEF DESCRIPTION OF THE DRAWINGS

The present disclosure may be better understood, and its numerous features and advantages made apparent to those skilled in the art by referencing the accompanying drawings.

FIG. 5 is a flow diagram illustrating a method for instantiating and operating an interaction model for an interaction detected in a transport flow in accordance with at least one embodiment of the present disclosure.

FIG. 6 is a diagram illustrating an example implementation of the method of FIG. 5 in accordance with at least one embodiment of the present disclosure.

DETAILED DESCRIPTION

Figure 1:
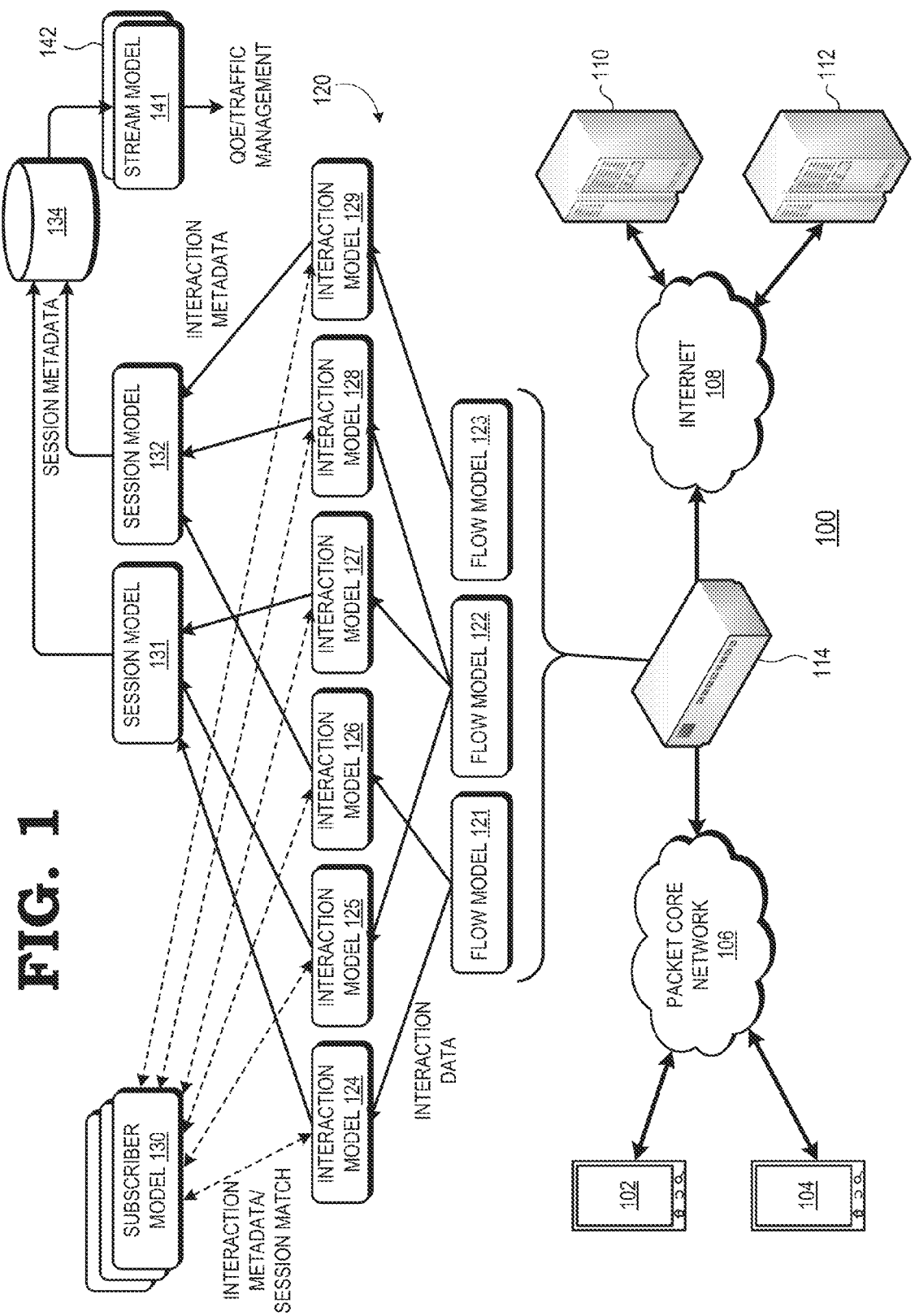
FIG. 1 is a block diagram illustrating a networked system employing a network device for identifying and organizing media sessions in an aggregate data pipe in accordance with at least one embodiment of the present disclosure.

FIGS. 1-9 illustrate example techniques for identification, organization, tracking, and analysis of media sessions between subscribers and media sources over network connections that carry media and non-media traffic. In at least one embodiment, one or more network devices are connected around a packet core network or other network to analyze data traffic. Each network device inspects a corresponding portion of the data traffic to identify transport flows, which may comprise, for example, TCP flows or other transport-layer flows associated with a corresponding subscriber. The network device instantiates a flow model for each identified transport flow. Each flow model then analyzes or otherwise processes a corresponding transport flow to identify application-level interactions in the data flow (e.g., HTTP request/response pairs). The network device then instantiates an interaction model for each interaction so identified. The corresponding interaction model analyzes the network data associated with the interaction to generate interaction metadata for the interaction. The interaction metadata and network data associated with the interaction (hereinafter, the "interaction data") then is provided to the related session model instantiated by the network device for a media session between a content source and the subscriber. As the subscriber may in some cases be involved with multiple sessions, the network device employs a subscriber model that matches each interaction model with a corresponding session model using specified relationship criteria. The related session model then processes one or both of the interaction data and the interaction metadata to generate, augment, or update session metadata maintained by the network device for the corresponding media session.

The session metadata can include, for example, Internet Protocol (IP) addresses or other network addresses previously matched in the session, media URLs for the media fragments already received in the media session, as well as session demographics representing the subscriber's interaction with the media session, such as the start time of the media session, the stop time, any trick play features enacted by the subscriber, and the streaming service employed to stream the media. The session metadata further can include for example, the streaming protocol (e.g., HTTP, RTMP, HLS, etc.) employed for the media session, expected IP addresses or media URLs (determined from, for example, an analysis of a session manifest or XML data transmitted as part of an interaction), as well as unique session identifiers, either generic or specific to the service employed, such as filename or other identification parameters, cookies implemented with the media content, and the like.

Each session model is intended to mimic the subscriber's perception of the corresponding media session. To this end, the session model can employ, or interact with, a stream model or other analytical tool to analyze media delivered over a network provider's network in terms of media sessions as perceived by their subscribers. A stream model or other analytical tool may be used to quantify media traffic over a network provider's network in terms of media sessions rather than the conventional bandwidth metric, for demographics analysis and market research (e.g., advertisement impression analysis). As another example, a stream model or other analytical tool may be used to organize media traffic on a network provider's network to apply traffic management policies on a per-session basis, to provide further processing of the media content of the media sessions (e.g., transcoding), and the like.

For ease of illustration, the techniques of the present disclosure are primarily described in the example context of TCP flows and HTTP transactions as transport-layer data flows and application-layer interactions, respectively. However, the present disclosure is not limited to these example implementations; rather, the techniques may be readily employed for any of a variety of transport-layer flow implementations, such as User Datagram Protocol (UDP), and the like, and may be employed for any of a variety of application-level protocols, such as Secure HTTP (HTTPS), Real Time Streaming Protocol (RTSP), Real Time Protocol (RTP), Real Time Messaging Protocol (RTMP), and the like.

FIG. 1 illustrates an example networked system 100 for delivery of streamed media and other data in accordance with at least one embodiment of the present disclosure. In the depicted example, the networked system 100 comprises a plurality of subscribers, such as subscribers 102, 104, coupled to a packet core network 106, which in turn is connected to another network 108. In this example, the network 108 comprises the Internet, and thus is referred to herein as "Internet 108." In other embodiments, the network 108 can comprise another private network or public network. The Internet 108 is connected to one or more content sources, such as content sources 110, 112. The content sources 110, 112 each comprise one or more data stores storing media data and one or more servers to serve the media data to the subscribers 102, 104 responsive to media sessions initiated by the subscribers 102, 104. Examples of the content sources 110, 112 include over the top (OTT) media providers, such as the on-demand media streaming services provided by Netflix, Inc., Hulu, Inc., and Amazon, Inc., or on-demand or pay-per-view media streaming provided by network operators.

The packet core network 106 comprises one or more data communication networks configured to carry data between the Internet 108 and the subscribers 102, and is managed by one or more service providers. The packet core network 106 can comprise, for example, a local area network (LAN), a wide area network (WAN), a metropolitan area network (MAN), a cellular data network or other mobile device network, such as a Universal Mobile Telecommunications System (UMTS) wireless network, a Long Term Evolution (LTE) wireless network, and the like.

The subscribers 102, 104 comprise any of a variety of devices, computing systems, or other user equipment configured to participate in media sessions with the content sources 110, 112 (or their proxies) to request and receive media data as one or more media streams. Examples of such equipment comprise data-enabled cellular phones ("smart phones"), network-enabled tablet computers, notebook computers, desktop computers, personal digital assistants, smart watches, gaming consoles, Internet-enabled house appliances, and the like. For the following, it is assumed for ease of description that there is a one-to-one correspondence between subscribers and device users. However, in many instances the subscriber may employ a gateway at the edge of the subscriber premises, and this gateway may obfuscate a multitude of connected devices sitting behind the gateway. In such instances, the gateway would be treated as the subscriber, and the media sessions initiated by the multitude of connected devices would be considered to the media sessions initiated by the gateway as the subscriber.

In operation, the networked system 100 operates to communicate data between the subscribers connected to the packet core network 106, such as subscribers 102, 104, and devices connected to the Internet 108, such as content sources 110, 112. Increasingly this communicated data is media data (which includes video data, audio data, or a combination thereof). Of this media data, much of it is streamed in real time between the content sources 110, 112 and the subscribers 102, 104, as opposed to transferred as a unit (e.g., a complete file) for storage and subsequent playback. Such media streaming sessions typically are initiated by the subscriber, which sends to a content source, for example, a request for a Hypertext Markup Language (HTML) document or other data structure listing media content available from the content source. This HTML and associated content is displayed as a webpage or other graphical user interface (GUI) at the subscriber device, and a user interacts with this webpage or other GUI to select a media program (e.g., a video clip, audio clip, etc.) by clicking on a webpage selecting a corresponding icon in a software application, and the like.

In a simpler implementation, the user's selection of a media program for playback uses a single TCP flow. In such instances, the media session for streaming the selected media program is initiated when the subscriber device configures a TCP flow with a server of the content source, and the server completes the connection. The subscriber device then sends an HTTP request (or FTP or RTP request) for the media program, in response to which the server (or associated server) begins sending the media data of the requested media program as an HTTP response. The subscriber device begins receiving the HTTP response and initiates processing and playback of the media content as it is being received. Upon completion of transmission of the media data, the subscriber device terminates the TCP flow and then continues to process the received media data until playback completes and the media session ends.

However, media sessions rarely are as simple as this example anymore. In a more typical case, the media data is fragmented into a number of media data fragments, each of which must be accessed by a separate HTTP request. For example, the HTTP Live Streaming (HLS) protocol fragments a media program into a number of media segments (i.e., fragments), each media segment being accessible from a corresponding uniform resource identifier (URI) identified in a playlist for the multimedia program. Moreover, to accelerate transmission of the media data to the subscriber, the subscriber device may open separate TCP flows for the receipt of multiple media data fragments from the content source in parallel. Typically, a separate TCP flow is opened for each media data fragment requested, and each request for a media data fragment necessitates a separate HTTP request/response interaction. As such, a media session in this more complex instance may involve numerous TCP flows, with many TCP flows operating concurrently. This complexity is further exacerbated by the implementation of certain "trick-play" features, such as fast-forward, rewind, advance, etc., that substantially adjust the current playback location within the multimedia program, and thus may result in closing of the currently open TCP flows and the initiation of one or more new TCP flows to obtain the multimedia fragments starting at the new location.

In at least one embodiment, the networked system 100 employs one or more network devices 114 at the edge of the packet core network 106 to monitor, organize, track, evaluate, or otherwise process media sessions between the subscribers and the Internet 108. To this end, each network device 114 is connected to an aggregate data pipe that serves as a connection for least a portion of the packet core network 106, and the network device 114 inspects the data traffic on this data pipe to identify and process media sessions between the Internet and some of all of the subscribers. To illustrate, the packet core network 106 could comprise a cellular network, and one or more network devices 114 could be attached to the backhaul connection of the cellular network to analyze the data traffic between the mobile devices of the cellular network and the Internet 108.

The network device 114, in at least one embodiment, is implemented as one or more computing systems, each computing system including one or more processors (e.g., a central processing device or CPU), one or more non-transitory computer-readable storage media, such as system memory or another storage device (e.g., flash memory, optical or magnetic disc drive, solid state hard drive, etc.), and other components, such as a network interface (e.g., a wireless local area network (WAN) interface or wired Ethernet interface), and a user interface (UI), all of which may be connected via one or more busses or other interconnects. The processor executes a set of executable instructions stored at the computer-readable storage medium, such as the system memory or flash memory, whereby the set of executable instructions represent one or more software programs. The software programs, when executed, manipulate the processor to perform various software-based functionality to implement at least a portion of the techniques described herein, provide visual information via a display device, respond to user input via the UI, and the like. One of ordinary skill, notwithstanding possibly significant effort and many design choices motivated by, for example, available time, current technology, and economic considerations, when guided by the concepts and principles disclosed herein will be readily capable of generating such software instructions and programs minimal experimentation.

The typical flow and interaction complexity of a multimedia session, as described above, can make the identification and analysis of a media session difficult. This task is made even more difficult in that a given subscriber may initiate multiple media sessions concurrently (e.g., the user may have multiple video-playback webpages open at once), and there often is a significant amount of non-media data also being communicated between the subscriber and the Internet 108 while the media session(s) are progressing. Moreover, different media fragments for a media program may come from different servers. All of this compounds the difficulty in analyzing the data pipe to identify media data associated with a particular media session and providing meaningful analysis or policing of that media session.

Accordingly, in at least one embodiment, the network device 114 employs a hierarchical modeling scheme 120 for the monitored traffic to efficiently identify and organize media-related traffic, thereby permitting the media stream of a media session to be more effectively identified and analyzed for Quality of Experience (QoE) and traffic policing purposes. The hierarchical modeling scheme 120 employs various models, including: flow models (e.g., flow models 121, 122, 123); interaction models interaction models 124, 125, 126, 127, 128); subscriber models (e.g., subscriber model 130); session models (e.g., session models 131, 132); and stream models (e.g., stream models 141, 142). In at least one embodiment, each model is instantiated in software executing at the network device 114 and includes control logic to control the behavior or output of the model responsive to its corresponding inputs, as described in greater detail below.

A subscriber model is instantiated for each subscriber monitored by the network device 114. To illustrate, for the following examples, the network device 114 instantiates the subscriber model 130 for the subscriber 102 and instantiates another subscriber model for the subscriber 104. As described in greater detail below, the subscriber model organizes session models for a corresponding subscriber and manages a media session relation algorithm used to match interaction models to corresponding session models.

Within the data connection of a subscriber, the network device 114 instantiates a flow model for each individual transport-layer flow (e.g., TCP flow) between the subscriber and an Internet server (e.g., a server of a content source) identified within the aggregate data traffic monitored by the network device 114. In the depicted example, the network device 114 has detected three TCP flows for the subscriber 102 and thus has instantiated the flow models 121, 122, 123 for the three TCP flows. Each flow model, receives, processes, and analyzes the traffic associated with the corresponding TCP to identify interactions within the TCP flow, with each interaction representing a specific instance of an application layer (e.g., HTTP, FTP, RTP, and RTMP) request and response communication, such as an HTTP request message from the subscriber 102 and a corresponding HTTP response message from, for example, a server of the content source 110. In response to detecting an interaction, the flow model instantiates an interaction model for the detected interaction. To illustrate, in the depicted example, the flow model 121 detects two interactions in the corresponding TCP flow and thus instantiates the interaction models 124, 126, the flow model detects three interactions in the corresponding TCP flow and thus instantiates the interaction models 125, 127, 128, and the flow model identifies one interaction in the corresponding TCP flow and thus instantiates the interaction model 129. The operation of the flow model is described in greater detail below with reference to FIGS. 3 and 4.

An instantiated interaction model analyzes the interaction data (e.g., the HTTP request message and the corresponding HTTP response message) of its associated interaction to determine whether the interaction data represents media data, and if so, generates interaction metadata representing various attributes of the interaction or the interaction data (e.g., the Internet Protocol (IP) address of the Internet server that provided the HTTP response message, the Uniform Resource Locator (URL) of the media fragment represented by the interaction, the protocols used in the interaction, etc.). The operation of the interaction model is described in greater detail below with reference to FIGS. 5 and 6.

With a media-related interaction of the flows of a subscriber so identified and analyzed by an interaction model, the network device 114 attempts to relate, or associate, the interaction model with a session model instantiated for the subscriber for a corresponding media session between the subscriber and an Internet server. In at least one embodiment, the interaction metadata generated by an interaction model is provided to the subscriber model for the subscriber. The subscriber model uses this interaction metadata, along with attributes or other information associated with the subscriber models, in an attempt to identify a matching session. If a suitable match is identified, the interaction model is related to, or associated with, the matching session model. To illustrate, in the example of FIG. 1 the network device 114 has instantiated two session models 131, 132 for two media sessions initiated by the subscriber 102, and has matched the interaction models 124, 125, 127 with the session model 131 and has matched the interaction models 125, 128, 129 with the session model 132. Each session model analyzes one or both of the interaction metadata and interaction data of a related interaction model to generate, augment, or update session metadata stored in a datastore 134 (e.g., a database or other data structure) of the network device 114. Operation of the session model is described in greater detail below with reference to FIGS. 7 and 8, and an example implementation of the media session relation algorithm is described below with reference to FIG. 9.

The session metadata may be analyzed by a stream model, such as stream models 141, 142 for the media sessions represented by session models 131, 132, respectively), to generate session-based analytics or metrics, such a per-session QoE metrics, per-session traffic management metrics, and the like. Each stream model manages interaction models within a session model and which have matching media characteristics (e.g., resolution of video codec). Many media sessions would have only a single stream model, although some streaming services offer the same content in multiple quality levels. Since most subscribers would perceive these quality levels all as part of the same media session, the session models would reflect this by managing multiple stream models when necessary. Each stream model receives the matching interaction models, stores them, and performs analytical algorithms that operate on all the content pertaining to an individual media stream (e.g., presentation quality analysis, traffic management, etc.). To this end, the stream models may use any of a variety of analytic techniques to develop these metrics. Generally, these analytic techniques seek to replicate the user's experience with the streamed media by estimating the ongoing state of the subscriber device with respect to the media session, and may include, for example, modeling video or audio buffers at the subscriber device. Examples of the techniques for analyzing the session metadata for a media session for such metrics, or for traffic management or policing, are found in co-pending U.S. patent application Ser. No. 13/053,222, filed on Mar. 22, 2011 and entitled "Delivery of Quality of Experience (QoE) in a Computer Network" and U.S. patent application Ser. No. 13/191,629, filed on Jul. 27, 2011 and entitled "System for Monitoring a Video Network and Methods for Use Therewith", the entireties of which are incorporated by reference herein.

Figure 2:
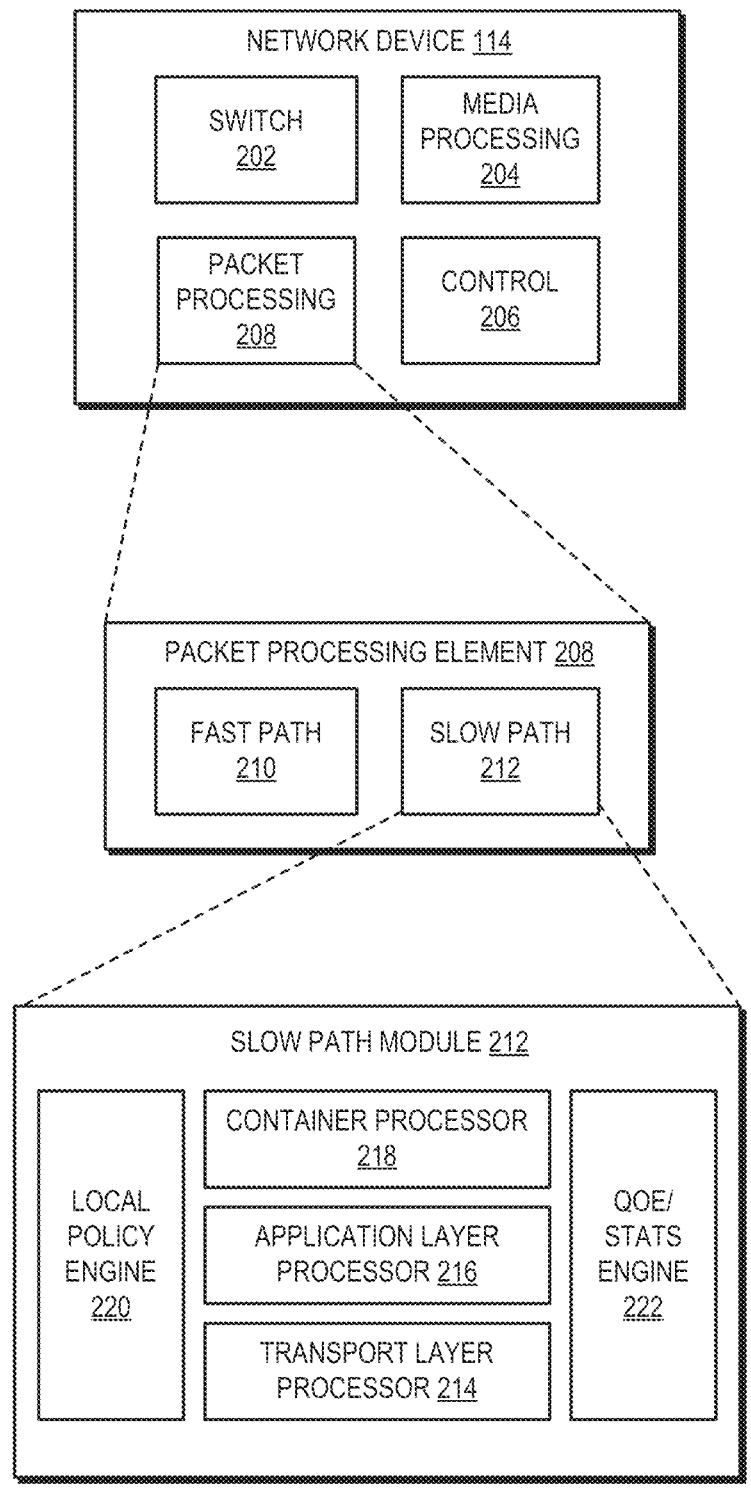
FIG. 2 is a block diagram an implementation of the network device of FIG. 1 in accordance with at least one embodiment of the present disclosure.

FIG. 2 illustrates a general architecture of the network device 114 in accordance with some embodiments. As noted above, the network device 114 is generally configured to identify media sessions in generic network data traffic, to permit selective media session-based policy execution and traffic management of in-progress communication flows, which is a significant enhancement over conventional per-flow or per-subscriber application of policies, in which policies are applied to individual flows (on a per packet or per flow basis) or applied to all data for a particular subscriber (per subscriber). Thus, the network device 114 may be configured to determine and enforce media session-based policies to balance the overall quality of experience (QoE) and network utilization for all users, based on the service provider's policy constraints.

To accomplish this, the network device 114 performs a number of functions that would conventionally be implemented via separate interconnected physical appliances. Accordingly, the network device 114 may comprise one or more switch elements 202, one or more media processing elements 204, one or more control elements 206, and one or more packet processing elements 208 in an integrated platform. In some embodiments, the function of one or more of the switch elements 202, the media processing elements 204, the packet processing elements 208 and the control elements 206 may be integrated, such that a subset of the elements implements the entire functionality of the network device 114 as described herein. In some embodiments, one or more of the elements may be implemented as a server "blade", which can be coupled together via a backplane. Each of the elements may comprise one or more processors and memories.

The switch elements 202 may be configured to perform control and data plane traffic load balancing across packet processing elements. Each switch element 202 may comprise one or more load balancers configured to distribute traffic from a large number of subscribers evenly across one or more packet processing elements 208. The traffic may be re-balanced between one or more packet processing elements 208 in the event of a failure of the packet processing element 208. The switch elements 202 may be configured to operate the network device 114 in one or more of a number of intersection modes. The intersection modes may permit passive monitoring of traffic, active management of traffic, or a combination thereof, for example by using an appropriate virtual local area network (VLAN) configuration.

The media processing element 204 may be configured to perform inline, real-time, audio and video transcoding of selected media sessions. The media processing element 204 also may be configured for an off-line, batch conversion workflow mode. Such an offline mode can be used to generate additional streams for a particular media content item at a variety of bit rates and resolutions as idle resources become available. This can be desirable where a particular media content item is frequently delivered to different subscriber devices in a variety of network conditions. The media processing element 204 may generally perform bit rate reduction. In some cases, the media processing element 204 may perform sampling rate reduction (e.g., spatial resolution and/or frame rate reduction for video, reducing sample frequency and/or number of channels for audio). In some other cases, the media processing element 204 may perform format conversion for improved compression efficiency, whereby the output media stream being encoded may be converted to a different, more efficient format than that of the input media stream being decoded (e.g., H.264/AVC vs. MPEG-4 part 2).

The control element 206 can perform system management and (centralized) application functions. System management functions may include configuration and command line interfacing, Simple Network Monitoring Protocol (SNMP) alarms and traps and middleware services to support software upgrades, file system management, and system management functions. The control elements 206 may comprise a processor and memory configured to perform centralized application functions. More particularly, the control element 206 may comprises a global policy engine (not shown).

Centralization of this processing at control element 206 may be advantageous as, due to load balancing, no single packet processing element 208 has a complete view of all sessions within a given network device, nor a view of all network devices. The policies available at the network device 114 may be dynamically changed by, for example, a network operator. In some cases, a global policy engine (not shown) of the control element 206 may access policies located elsewhere on a network. For example, the global policy engine may gather media session policies based on the 3rd Generation Partnership Project (3GPP) Policy Control and Charging (PCC) architecture ecosystem (e.g., with a Policy and Charging Rules Function (PCRF)). In such embodiments, the policy system may enforce policy (i.e., carry out a Policy Control Enforcement Function (PCEF) with Application Function (AF), or Application Detection and Control (ADC)).

The global policy engine may maintain a set of locally configured node-level policies, and other configuration settings, that are evaluated by a rules engine in order to perform active management of subscribers, locations, and media sessions. Media sessions may be subject to global constraints and affected by dynamic policies triggered during the lifetime of a session. Accordingly, the global policy engine may keep track of live media session metrics and network traffic measurements by communicating with the NRM module. The global policy engine may use this information to make policy decisions when each media session starts, throughout the lifetime of the media session, or both, as the global policy engine may adjust polices in the middle of a media session due to changes, e.g. in network conditions, changes in business objectives, time-of-day, etc.

The global policy engine may also utilize subscriber information. In some cases, subscriber information may be based on subscriber database data obtained from one or more external subscriber databases.

The packet processing element 208 may be configured to analyze network traffic across all layers of the TCP/IP (or UDP/IP, or other equivalent) networking stack, identify flows, interactions, and corresponding media sessions, and apply policy. To facilitate processing with minimal latency and maximum throughput, packet processing workloads may be divided into a fast-path module 210 and slow-path module 212, which provide separate threads of execution. Using a single thread of execution to process every packet may result in excessive latency for packets that require significant processing and also fail to take advantage of parallelization.

The packet processing element 208 can be divided into two (or more layers), where the base layer may be processed in the fast-path module 210 and one or more additional layers processed in the slow-path module 212. The fast-path module 210 implements a first stage of packet processing, which requires only a minimal amount of computational effort. Packets that do not require advanced processing may be forwarded immediately at this stage and are re-enqueued "back to the wire" with very low latency. Packets that require additional processing can be forwarded to the slow-path module 212 for deeper processing. Slow-path processing may be performed independently of, or in parallel with, the fast-path processing, such that slow-path processing does not block or impede fast-path processing.

There may be one or more fast-path modules 210 per packet processing element 208. Each fast-path module 210 may receive packets from, such as, for example, a network interface, a load balancer, etc. The fast-path module 210 may identify and parse IP layer data (IPv4/IPv6) in each packet, perform IP defragmentation, and associate the packets with their appropriate layer-4 UDP or TCP flows.

The fast-path module 210 may support multiple flow states, such as "forward", "tee", "vee", and "drop". In the forward state, packets are re-enqueued to the network interface for immediate transmission, without processing by slow-path module 212. Fast-path module 210 may look up a subscriber or flow information associated with the packet and decide whether the packet should be forwarded based on such information. In the tee state, packets are both re-enqueued to the network interface for immediate transmission and copied to a slow-path module 212 for further processing. In the vee state, packets are delivered to a slow-path module 212 for further processing. After processing, the slow-path module 212 may return one or more packets to the fast-path module 210 to be re-enqueued to the network interface for transmission. Accordingly, in the vee or inline mode, packets may be considered as being processed inline, that is, processed first before being forwarded in modified or unmodified form to the original destination.

Generally, the slow-path module 212 sends and receives messages to and from the fast-path module 210. The slow-path module 212 parses the application layer of received/sent packets, and executes policy based on subscriber, device, location or media session analysis and processing, including implementation of the hierarchical modeling scheme 120 (FIG. 1) described herein. As illustrated, the slow-path module 212 may comprise a transport layer processor 214, an application-layer processor 216 and a container processor 218. The slow-path module 212 may further comprise a local policy engine 220 and QoE and statistics engine 222. The transport layer processor 214 may implement flow models (e.g., flow model 123, FIG. 1) that parse the transport layer (e.g. TCP, UDP, etc.) and keep track of when packets are sent and received, including when packets are acknowledged (or lost) by the subscriber, to permit modeling of the subscriber device video buffer, for example, as described in U.S. patent application Ser. No. 13/231,497, entitled "Device with video buffer modeling and methods for use therewith", the entire contents of which are hereby incorporated by reference. Transport layer processors 214 may also reconstruct the data for the application layer and invoke appropriate application layer processors (e.g., HTTP) by examining incoming data from both directions. In some embodiments, the transport layer processor 214 may provide functions associated with a TCP proxy as described herein, in conjunction with other elements of slow-path module 212.

The application-layer processor 216 may be configured to operate on certain types of detected application layer content, such as HTTP, RTSP and RTMP. Once the application type has been identified, the transport layer processors 214 may largely delegate subsequent payload parsing to the application layer processors 216. The application-layer processors 216 may be responsible for identifying and delegating to appropriate session models when media sessions are detected, and for relating flows, characteristic interactions and streams to particular sessions, including implementation of the hierarchical modeling scheme 120 described herein. In most cases, the application layer protocols used for media streaming can be identified by analyzing the first few bytes of payload data in an interaction request or interaction response. After identifying the application payload, the payload can be parsed to find the media content, if any. As noted above, this can be achieved by dividing the communication into independent interactions, which correspond to individual request/response pairs. Each interaction is evaluated by a corresponding interaction model instantiated by the application-layer processor 216 to determine if the content is streaming media. If the interaction contains streaming media, it is further analyzed to extract media characteristics and other interaction metadata. Those interactions sharing common media characteristics may be matched to, and processed by, a corresponding session model instantiated for the media session.

The container processor 218 may parse, analyze and process media containers such as FLV, MP4, ASF and the like. In some variant embodiments, it may also parse, analyze and process associated metadata such as gzipped content, manifest files, and the like.

Local policy engines (LPE) 220 may be deployed on every packet processing element 208 and act as a Policy Enforcement Point (PEP). The LPE 220 sends policy requests to the global policy engine of control element 206 and receives and processes policy responses from the global policy engine. The LPE 220 may provide local policy decisions for the slow-path module 212, allowing the slow-path module 212 to implement access control (i.e. whether to allow the media session), re-multiplexing, request-response modification, client-aware buffer shaping, transcoding, adaptive streaming control, in addition to the more conventional per-flow action such as marking, policing/shaping and the like. Media session policy actions may be further scoped, that is, applied only to specific sites, devices, resolutions, or constrained, that is, subject to minimum/maximum bit rate, frame rate, QoE targets, resolution, and the like, as described herein.

The QoE and statistics engine 222 may generate statistics and QoE measurements for media sessions using the session metadata stored in the data store 134 (FIG. 1), may provide estimates of bandwidth required to serve a subscriber device request and media stream at a given QoE, and may make these values available as necessary within the system. Examples of statistics that may be generated comprise, for example, bandwidth, site, device, video codec, resolution, bit rate, frame rate, clip duration, streamed duration, audio codec, channels, bit rate, sampling rate, and the like. QoE measurements computed may comprise, for example, delivery QoE, presentation QoE, and combined QoE.

Figure 3:
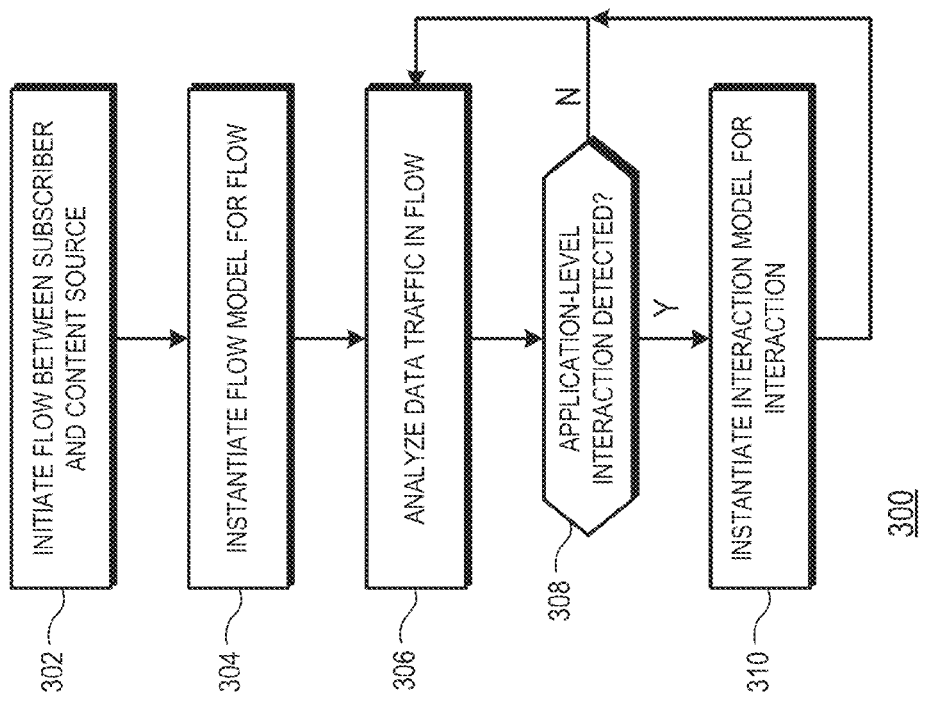
FIG. 3 is a flow diagram illustrating a method for instantiating and operating a flow model for a media session in accordance with at least one embodiment of the present disclosure.

FIG. 3 illustrates a method 300 of operation of a flow model in the hierarchical modeling scheme 120 implemented by the network device 114 of FIGS. 1 and 2. The method 300 initiates at block 302 with the initiation of a TCP flow (or other transport flow) within a media session for a subscriber. In response to detecting the TCP flow in the aggregate data traffic being monitored, the network device 114 instantiates a flow model for the detected TCP flow at block 304.

At block 306, the instantiated flow model analyzes data traffic in the TCP flow to detect an application-level interaction. In at least one embodiment, the flow model detects such interactions through analysis of the headers or payloads of the packets in the TCP flow. To illustrate, HTTP interaction typically is represented as an HTTP request message coupled with the resulting HTTP response message, and the flow model can detect an HTTP interaction by detecting, for example, a request command (e.g., "GET") in the HTTP request message, and observe the traffic from the targeted Internet server for the resulting HTTP response message. In response to detecting an application-level interaction (block 308), at block 310 the flow model instantiates an interaction model for the detected interaction and produces interaction data for the interaction module to analyze. This interaction data can include, for example, the headers and payloads of communications involved in the interaction (e.g., the HTTP request and response messages), or filtered representations thereof. The flow model repeats the process of blocks 306, 308, and 310 for each interaction detected in the traffic for the TCP flow, with each detected interaction spawning a separate flow model.

Figure 4:
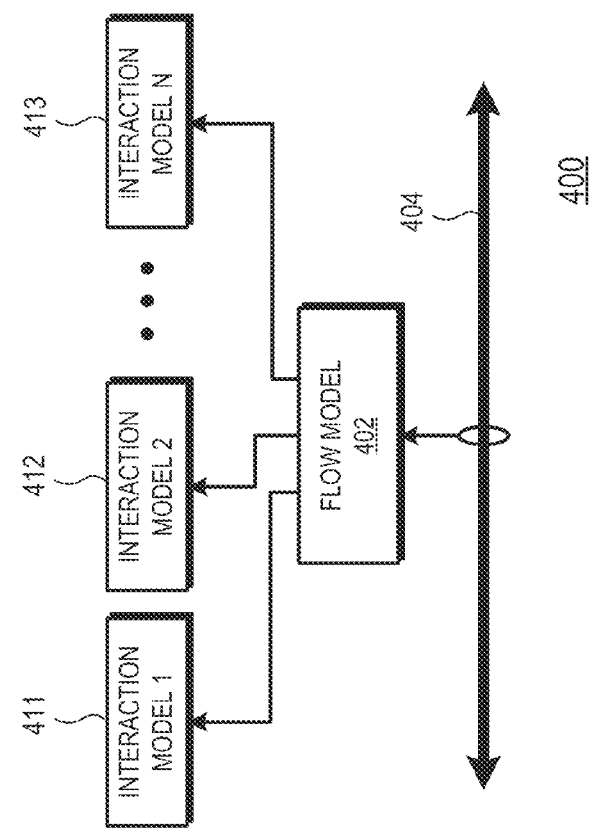
FIG. 4 is a diagram illustrating an example implementation of the method of FIG. 3 in accordance with at least one embodiment of the present disclosure.

FIG. 4 illustrates a simple example implementation 400 of the method 300 in accordance with at least one embodiment of the present disclosure. As shown in example implementation 400, the network device 114 (FIG. 1), monitoring a data pipe representing the aggregate data monitored by the network device, instantiates a flow model 402 in response to detecting a new TCP flow 404 in the data pipe. In the course of subsequently monitoring the data traffic of the TCP flow 404, the flow model 402 detects a sequence of N application-level interactions, and thus instantiates interaction models 1-N (also identified as interaction models 411, 412, 413 in FIG. 4), one for each of the N interaction detected, and provides each interaction model with the interaction data from the corresponding interaction.

FIG. 5 illustrates a method 500 of operation of an interaction model in the hierarchical modeling scheme 120 implemented by the network device 114 of FIGS. 1 and 2. The method 500 initiates at block 502 with the receipt of interaction data for an interaction at the interaction model following instantiation of the interaction model by a flow model (see block 310, FIG. 3). As noted, the interaction data can include the payloads of the request or the response messages of the interaction. As media data would be provided as a payload of the response message of the interaction, at block 504 the interaction model determines whether the interaction pertains to a media stream by analyzing the payload of the response message to determine whether there is media data present in the response message. If not, the interaction is not germane to the media session being analyzed, and thus at block 506 the network device 114 terminates or aborts the interaction model instantiated for the transaction.

Otherwise, if the interaction contains media data, at block 508 the interaction model processes the interaction data to generate interaction metadata for the interaction. This interaction metadata can include, for example, the IP address of the Internet server that sourced the media data, the URL of the media data, file name, various HTTP parameters present in the request or response message headers, such as HTTP Range, Content-Type, and the like. The interaction data also may include metadata from the response content, for example, a content signature, media data, and the like.

The interaction may be identified, but the media session to which it belongs is not identified at this point. Accordingly, at block 510, the subscriber model (e.g., subscriber model 130, FIG. 1) instantiated for the subscriber attempts to relate or associate the interaction model, and its associated data and metadata, with a session model that has been instantiated for a media session of the subscriber. This relationship between the interaction model and corresponding session model is performed on the basis of a comparison of one or more attributes or characteristics of the interaction metadata to one or more attributes or characteristics of the session models. An example algorithm for performing this relation process is described below with reference to the method 900 of FIG. 9. With the matching session model identified, at block 512 the interaction model forwards the interaction data and interaction metadata to the matching session model. The session model then processes this data and metadata to generate session metadata tier the media session, as described below with reference to method 700 of FIG. 7.

FIG. 6 illustrates a simple example implementation 600 of the method 500 in accordance with at least one embodiment of the present disclosure. As shown in example implementation 600, the interaction model 411 (FIG. 4) receives interaction data for a corresponding interaction from the flow model 402 (FIG. 4), and generates interaction data, such as the IP address of the Internet server serving the interaction, and the application-layer protocol used for the interaction. This interaction metadata is supplied to a subscriber model 602 instantiated for the subscriber. The subscriber model 602 compares this interaction metadata with corresponding attributes of the M session models (also identified as session models 611, 612, and 613) that have been instantiated for the subscriber, and based on the IP address and application-level protocol identifies only session model 612 as a strong match, and thus relates the interaction model 411 with the session model 612. On the basis of this relation, the interaction model 411 provides its interaction metadata (and may provide some or all of its interaction data as well) to the session model 612, which then analyzes this information to provide session metadata for the media session identified for the interaction.

Figure 7:
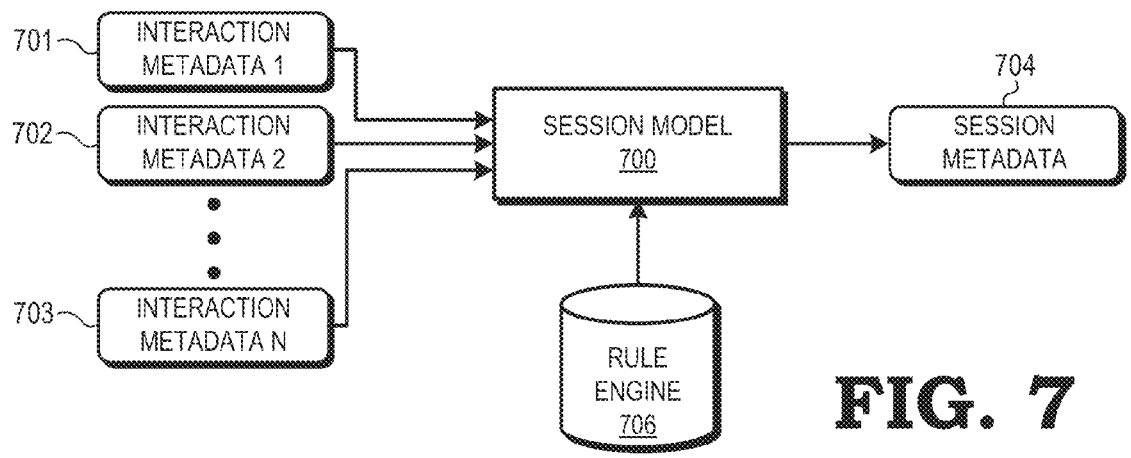
FIG. 7 is a block diagram illustrating an implementation of a session model in accordance with at least one embodiment of the present disclosure.

FIG. 7 illustrates an example implementation of a session model 700 in accordance with at least one embodiment. The session model 700 corresponds to, for example, the session models 131 and 132 of FIG. 1 and the session models 611, 612, and 613 of FIG. 6. In operation, the session model 700 receives interaction metadata from one or more related interaction models, such as N sets of interaction data from N interaction models (identified as interaction data 701, 702, 703), from which the session model 700 extracts session metadata 704 via the use of a session metadata rule engine 706. The extracted session metadata 704 is used both for the purposes of session matches (see FIG. 9), as well as for reporting session-level demographics, performing higher order analysis such as QoE modeling, and implementing policy for traffic management purposes. The extracted session metadata 704 can include aggregation of metadata obtained from previously matched interactions, such as one or more interaction server IP addresses, HTTP headers, and the like. The extracted session metadata 704 also can include more specific metadata pertaining to the media site, streaming protocol, and media content, such as site-specific content identifiers (such as a YouTube signature HTTP parameter, a Netflix expiry token, and similar identifiers), protocol-specific identifiers (such as lists of expected URLs, and similar identifiers), and content-specific identifiers (such as video resolution, video codec, and similar identifiers). These identifiers are extracted from the interaction metadata via the use of the rule engine 706, which contains and provides rule-based instructions for how to identify and process identifiers for a variety of media sites, protocols, and content types. To illustrate, the rule engine 706 may have one set of rule-based instructions for application to media sessions identified as Netflix media sessions, another set of rules-based instructions for application to media sessions identified as YouTube media sessions, and then one or more generic sets of rule-based instructions that may be applied based on, for example, the protocol used for the media session.

Figure 8:
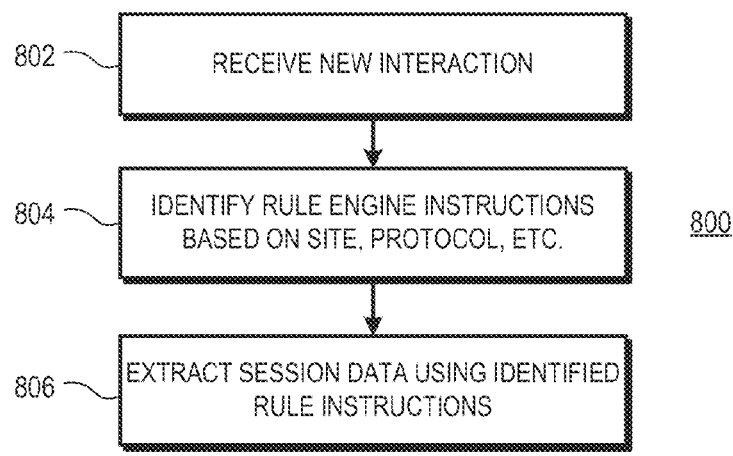
FIG. 8 is a flow diagram illustrating an example method of operation of the session model of FIG. 7 in accordance with at least one embodiment of the present disclosure.

FIG. 8 illustrates an example method 800 of operation of the session model 700 of FIG. 7 or extracting session metadata from a new set of interaction metadata accordance with some embodiments. At block 802, an interaction model (e.g., interaction model 411 of FIG. 6) is instantiated in response to a detected interaction and related to the session model 700 and the interaction metadata obtained by the interaction model is provided to the session model 700. At block 802, the session model uses the rule engine 706 to identify a set of one or more rule-based instructions related to the interaction based on the media site, streaming protocol, and other generic interaction metadata. At block 806, the session model 700 uses the identified instructions to extract site-specific, protocol-specific, and content-specific identifiers that are added to the session metadata for the purposes of session matching. For example, the session model 700 might analyze interaction metadata that specifies that the response originated from the YouTube media site. The rule engine 706 contains specialized instructions for YouTube that the session model 700 uses to retrieve the unique YouTube signature parameter from within the interaction URL. This unique identifier is added to the session metadata (e.g., session metadata 704, FIG. 7) and can be used to generate strong session matches with future interactions that share the same unique identifier. As another example, the session model 700 might analyze interaction metadata that specifies the interaction response is using the HTTP Live Streaming protocol and that the response data contains a HTTP Live Streaming playlist file. The rule engine 706, in this case, may contain specialized instructions to process the playlist file to generate a list of URLs that specify the available content for the session. This list of URLs is added to the session metadata and can be used to generate strong session matches with future interactions whose URLs match an entry in this list.

Figure 9:
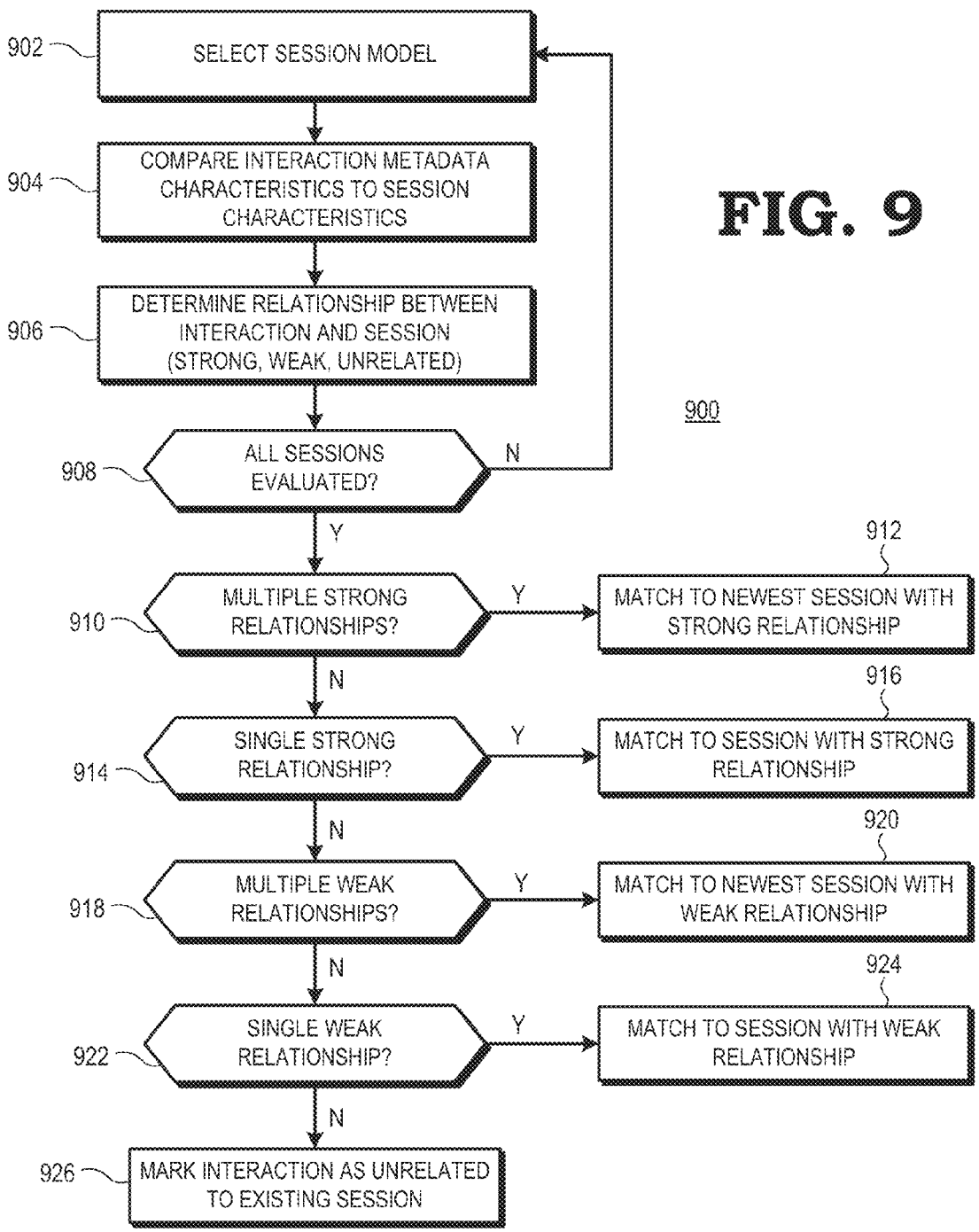
FIG. 9 is a flow diagram illustrating a method for matching an interaction model with a corresponding session model in accordance with at least one embodiment of the present disclosure.

FIG. 9 illustrates an example method 900 for implementing the media session relation algorithm to relate an interaction model instantiated for a detected interaction in a flow for a subscriber with a session model instantiated for a media session of the subscriber. Generally, the method 900 involves iterating through all of the interaction models for the subscriber and determining a relationship between the interaction model and each session, in a process which can be analogized to having each session model "vote" on whether it is to process the interaction for its corresponding media session. The method 900 initiates at block 902 with receipt of interaction metadata from the interaction model at the subscriber model, in response to which the subscriber model selects an initial session model of the one or more session models for the subscriber. Accordingly, at block 904, the subscriber model determines the relationship between the interaction model and the selected session model based on a comparison of one or more attributes of the interaction model and one or more attributes of the session model. To illustrate, such comparisons can include the protocol associated with the interaction model and the protocol associated with the session model (e.g., RTMP or HTTP), comparison of unique content identifiers (e.g., the YouTube signature), comparison of media URL or IP address of the interaction metadata does not match a media URL or IP address present in the already-generated session metadata, and the like.

In one embodiment, the relationship between the interaction model and the selected session model is characterized as one of three categories: "unrelated", "weak," and "strong." The particular category selected for the relationship depends on the degree and kind of attribute matching between the interaction model and the session model. To illustrate using the example attributes described above, if the protocols do not match, or there is a unique identifier in one but not the other, or if there is no (partial) match between IP addresses or media URLs, the relationship may be categorized as "unrelated". If the protocols match, unique identifiers match, and IP addresses/media URLs match, then the relationship can be categorized as "strong." If there is no strong evidence of a match or mismatch, such as where the protocols match but there are no unique identifiers and the match between IP addresses or media URLs is inconclusive (e.g., there is a partial match between the media URLs whereby the domain portions match, but the ports or paths in the URL differ), the relationship may be categorized as "weak" because multiple sessions are rare within a subscriber.

The process of selecting a session model (block 902), comparing its attributes with the interaction model (block 904), and determining the relationship between the session model and the interaction model (block 906) is repeated until all session models for the subscriber have been evaluated (block 908). At this point, the subscriber model then uses the relationships between the session models and the interaction model to select the best match. Accordingly, at block 910 the subscriber model determines whether there are multiple "strong" relationships. If so, in one embodiment, at block 912 the subscriber model breaks such ties by selecting the newest of the session models having a strong relationship as matched to the interaction model as it is statistically the most likely session. If there are not multiple strong relationships, at block 914 the subscriber model considers whether there is a single strong relationship. If so, at block 916 the subscriber model selects the session model having this strong relationship as matched to the interaction model.

If no strong relationships exist, at block 918 the subscriber model determines whether there are multiple "weak" relationships. If so, at block 920 the subscriber model selects the newest session model of the session models having weak relationships as the session model matching the interaction model. If there are not multiple weak relationships, at block 922 the subscriber model considers whether there is a single weak relationship. If so, at block 924 the subscriber model selects the session model having this weak relationship as matched to the interaction model.

If no strong or weak relationships exist, at block 926 the subscriber model determines the interaction model to be unrelated to any current session model. In such instances, a new session model is instantiated and the interaction model is related to it instead.

Once a match (or no match) is identified, as described above the interaction data and metadata is processed by the matched session model as part of the session model's process of building session metadata based on detected interactions related to the underlying media session.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a networked system connecting a subscriber to a content source via one or more networks, a computer-implemented method comprising:
    instantiating a session model for a media session between the subscriber and the content source;
    generating, by the session model, using control logic included in the session model, session metadata from application-layer interactions between the subscriber and the content source;
    instantiating an interaction model in response to detecting an application-layer interaction in a transport flow of the subscriber, the application-layer interaction comprising media data for the media session;
    generating, by the interaction model, using control logic included in the interaction model, interaction metadata representative of the application-layer interaction;
    matching, by the session model, the interaction model to the session model; and
    processing, by the session model, at least one of the interaction metadata and the media data for generation of the session metadata responsive to matching the interaction model to the session model.

2. The method of claim 1, further comprising:
    instantiating a flow model responsive to detecting initiation of the transport flow in data traffic between a network serving the subscriber and another network;
    detecting, by the flow model, using control logic included in the flow model, the application-layer interaction based on an analysis of the data traffic; and
    instantiating the interaction model, by the flow model, in response to detecting the application-layer interaction.

3. The method of claim 2, wherein:
    the transport flow comprises a Transmission Control Protocol (TCP) flow; and
    the application-layer interaction comprises an HTTP request message from the subscriber and an HTTP response message from the content source.

4. The method of claim 1, wherein matching the interaction model to the session model comprises:
    instantiating a subscriber model for the subscriber, the subscriber model using control logic included in the subscriber model for:
    receiving the interaction metadata from the interaction model;
    identifying, for each session model of a set of session models instantiated for the subscriber, a relationship between the session model and the interaction model based on a comparison of one or more attributes of the session model with one or more attributes identified from the interaction metadata; and
    selecting a session model from the set of session models as the session model related to the interaction model based on strengths of the relationships of the set of session models.

5. The method of claim 4, wherein:
    the strength of each relationship is categorized as a strong, weak, or unrelated,
    the subscriber model selects the newest session model from the set responsive to multiple session models having strong relationships, and
    the subscriber model selects the newest session model from the set responsive to no session model having a strong relationship and multiple session models having weak relationships.

6. The method of claim 5, wherein the one or more attributes of the session model and the one or more attributes identified from the interaction metadata comprise at least one of: a communication protocol; a content identifier; a network address; and a uniform resource locator.

7. The method of claim 1, wherein:
    the transport flow is a first transport flow, the application-layer interaction comprises a first application-layer interaction, the interaction model comprises a first interaction model, the interaction metadata comprises first interaction metadata, and the media data comprises first media data; and
    the method further comprises:
        instantiating a second interaction model in response to detecting a second application-layer interaction in one of the first transport flow or a second transport flow of the subscriber, the second application-layer interaction comprising second media data for the media session;
        generating, by the second interaction model, second interaction metadata representative of the second application-layer interaction; and
        processing at least one of the second interaction metadata and the second media data by the session model for inclusion in the session metadata responsive to matching the second interaction model to the session model.

8. The method of claim 1, wherein:
    the interaction metadata comprises at least one of: a network address of a server of the content source; a uniform resource locator associated with the media data; one or more HyperText Transport Protocol parameters; and a content signature; and
    the session metadata comprises at least one of: session demographics for the subscriber's interaction with the media session; a streaming protocol used for the media session; expected network addresses; expected media uniform resource identifiers; and unique session identifiers.

9. The method of claim 1, further comprising:
    analyzing the session metadata to generate one or more analytic metrics, including one or more Quality of Experience (QoE) metrics.

10. A network device for analyzing data traffic between a subscriber and a content source via one or more networks, the network device comprising:
    a session model instantiated for a media session between the subscriber and the content source, the session model using control logic included in the session model to generate session metadata from application-layer interactions between the subscriber and the content source; and
    a set of one or more interaction models, each interaction model instantiated in response to detecting a corresponding application-layer interaction in a transport flow of the subscriber, the application-layer interaction comprising media data for the media session,
    wherein each interaction model of the set uses control logic included in the interaction model to generate corresponding interaction metadata representative of the corresponding application-layer interaction,
    wherein the session model uses its control logic to match the interaction model to the session model, and
    wherein the session model processes in response to matching the interaction model to the session model, for each interaction model, at least one of the interaction metadata and the media data of the interaction model for inclusion in the session metadata.

11. The network device of claim 10, further comprising:
a flow model instantiated in response to detecting initiation of a transport flow in data traffic between a network serving the subscriber and another network,
wherein the flow model uses control logic included in the flow model to detect an application-layer interaction in the transport flow based on an analysis of the data traffic, and further uses the control logic to instantiate an interaction model of the set of one or more interaction models in response to detection of the application-layer interaction.

12. The network device of claim 10, wherein:
the transport flow comprises a Transmission Control Protocol (TCP) flow; and
the application-layer interaction comprises an HTTP request message from the subscriber and an HTTP response message from the content source.

13. The network device of claim 10, further comprising:
a subscriber model instantiated for the subscriber, the subscriber model using control logic included in the subscriber model to match an interaction model of the set to the session model by:
receiving the interaction metadata from the interaction model;
identifying, for each session model of a set of session models instantiated for the subscriber, a relationship between the session model and the interaction model based on a comparison of one or more attributes of the session model with one or more attributes identified from the interaction metadata; and
selecting a session model from the set of session models as the session model related to the interaction model based on strengths of the relationships of the set of session models.

14. The network device of claim 13, wherein:
the strength of each relationship is categorized as a strong, weak, or unrelated,
the subscriber model uses its control logic to select the newest session model from the set responsive to multiple session models having strong relationships, and
the subscriber model uses its control logic to select the newest session model from the set responsive to no session model having a strong relationship and multiple session models having weak relationships.

15. The network device of claim 14, wherein:
the session model uses its control logic to process at least one of the interaction metadata and the media data based on the categorization of the relationship to generate session metadata for the corresponding media session.

16. A non-transitory computer readable storage medium storing a set of executable instructions, the set of executable instructions to manipulate at least one processor to:
instantiate a session model for a media session between a subscriber and a content source;
generate, by the session model, using control logic included in the session model, session metadata from application-layer interactions between the subscriber and the content source in data traffic between one or more networks;
instantiate an interaction model in response to detecting an application-layer interaction in a transport flow of the subscriber, the application-layer interaction comprising media data for the media session;
generate, by the interaction model, using control logic included in the interaction model, interaction metadata representative of the application-layer interaction;

match, by the session model, the interaction model to the session model; and
process, by the session model, at least one of the interaction metadata and the media data for generation of the session metadata responsive to matching the interaction model to the session model.

17. The non-transitory computer readable storage medium of claim 16, wherein the set of executable instructions further are to manipulate at least one processor to:
instantiate a flow model responsive to detecting initiation of the transport flow in data traffic between a network serving the subscriber and another network;
detect, by the flow model, using control logic included in the flow model, the application-layer interaction based on an analysis of the data traffic; and
instantiate the interaction model, by the flow model, in response to detecting the application-layer interaction.

18. The non-transitory computer readable storage medium of claim 16,
wherein:
the transport flow comprises a Transmission Control Protocol (TCP) flow; and
the application-layer interaction comprises an HTTP request message from the subscriber and an HTTP response message from the content source.

19. The non-transitory computer readable storage medium of claim 16, wherein the set of executable instructions further are to manipulate at least one processor to match the interaction model to the session model by:
instantiating a subscriber model for the subscriber using control logic included in the subscriber model;
receiving the interaction metadata from the interaction model by the subscriber model;
identifying, by the subscriber model for each session model of a set of session models instantiated for the subscriber, a relationship between the session model and the interaction model based on a comparison of one or more attributes of the session model with one or more attributes identified from the interaction metadata; and
selecting, by the subscriber model, a session model from the set of session models as the session model related to the interaction model based on strengths of the relationships of the set of session models.

20. The non-transitory computer readable storage medium of claim 19, wherein:
the transport flow is a first transport flow, the application-layer interaction comprises a first application-layer interaction, the interaction model comprises a first interaction model, the interaction metadata comprises first interaction metadata, and the media data comprises first media data,
the set of executable instructions further are to manipulate at least one processor to:
instantiate a second interaction model in response to detecting a second application-layer interaction in one of the first transport flow or a second transport flow of the subscriber, the second application-layer interaction comprising second media data for the media session;
generate, by the second interaction model, second interaction metadata representative of the second application-layer interaction; and
process at least one of the second interaction metadata and the second media data by the session model for inclusion in the session metadata responsive to matching the second interaction model to the session model.

* * * * *